United States Patent
Kim et al.

(10) Patent No.: US 10,544,813 B2
(45) Date of Patent: Jan. 28, 2020

(54) ELECTRICAL CLAMPING APPARATUS

(71) Applicants: Energium Co., Ltd., Seoul (KR); Seoul National University R&DB Foundation, Seoul (KR)

(72) Inventors: Jongwon Kim, Seoul (KR); Sumin Park, Seoul (KR); Jangho Bae, Seoul (KR); Jeongae Bak, Seoul (KR); Kyungsung Chu, Seoul (KR); Junghun Kang, Seoul (KR); Bilegt Erkhes, Seoul (KR)

(73) Assignees: Energium Co., Ltd., Seoul (KR); Seoul National University R&DB Foundation, Seoul (KR)

( * ) Notice: Subject to any disclaimer, the term of this patent is extended or adjusted under 35 U.S.C. 154(b) by 254 days.

(21) Appl. No.: 15/719,088

(22) Filed: Sep. 28, 2017

(65) Prior Publication Data

US 2018/0051725 A1 Feb. 22, 2018

(30) Foreign Application Priority Data

Jul. 28, 2016 (KR) .................... 10-2016-0095811

(51) Int. Cl.
*F16B 2/18* (2006.01)
*F16H 37/12* (2006.01)
(Continued)

(52) U.S. Cl.
CPC ............... *F16B 2/185* (2013.01); *B25B 5/12* (2013.01); *F16H 37/12* (2013.01); *F16H 37/124* (2013.01);
(Continued)

(58) Field of Classification Search
CPC ............... B25B 5/04; B25B 5/12; B25B 5/16
See application file for complete search history.

(56) References Cited

U.S. PATENT DOCUMENTS 3,027,155 A * 3/1962 Paterson ................. B25B 5/122
269/32
4,635,911 A * 1/1987 Lovrenich ................. B25B 5/06
269/224
(Continued)

FOREIGN PATENT DOCUMENTS

CN 104924011 A 9/2015
EP 1360039 A1 11/2003
(Continued)

OTHER PUBLICATIONS

Office Action in KR Application No. 10-2016-0095811 dated Jul. 28, 2016, 7 pages.
(Continued)

*Primary Examiner* — Tyrone V Hall, Jr.
(74) *Attorney, Agent, or Firm* — Marshall, Gerstein & Borun LLP (57) ABSTRACT

An electrical clamping apparatus is provided that can reduce an entire size using a motor as a driving source and largely improve a grip torque by applying a sliding crank portion and a changed toggle link portion with a driving force transfer mechanism. The electrical clamping apparatus for clamping and fixing one side of a panel includes a main body; a driving motor installed within the main body and that generates a driving force; a clamp portion that clamps or unclamps the panel; a toggle link portion connected to the clamp portion and that transfers rotatory power to the clamp portion to rotate the clamp portion; a driving force transfer portion connected to the driving motor to transfer a driving force of the driving motor to the toggle link portion; and a sliding crank portion connected to one side of the toggle link portion to convert a rotational motion of the driving force transfer portion to a linear reciprocating motion and to operate the toggle link portion in a state in which one side (Continued)

thereof is connected to the driving force transfer portion and in which the other side thereof is vertically bent toward the toggle link portion.

9 Claims, 12 Drawing Sheets

(51) Int. Cl.
    *B25B 5/12*     (2006.01)
    *F16B 2/10*     (2006.01)
    *F16H 1/16*     (2006.01)
    *F16H 21/44*     (2006.01)

(52) U.S. Cl.
    CPC ................. *F16B 2/10* (2013.01); *F16H 1/16* (2013.01); *F16H 21/44* (2013.01)

(56) References Cited

U.S. PATENT DOCUMENTS

| | | | |
|---|---|---|---|
| 4,905,973 A * | 3/1990 | Blatt | B25B 5/122 269/228 |
| 6,003,850 A * | 12/1999 | Crorey | B23K 37/0435 269/233 |
| 6,115,898 A * | 9/2000 | Sawdon | B25B 5/087 269/233 |
| 6,279,886 B1 * | 8/2001 | Grossart | B25B 5/087 269/24 |
| 6,338,476 B1 * | 1/2002 | Takahashi | B25B 5/122 269/228 |
| 6,354,580 B1 * | 3/2002 | Nagai | B25B 5/12 269/225 |
| 6,471,199 B2 * | 10/2002 | Nagai | B25B 5/12 269/228 |
| 6,557,840 B2 | 5/2003 | Sawdon | |
| 6,557,841 B2 * | 5/2003 | Dellach | B25B 5/122 269/222 |
| 6,565,074 B1 * | 5/2003 | Wheeler | B25B 5/122 269/228 |
| 6,641,123 B2 * | 11/2003 | Takahashi | B25B 5/087 269/222 |
| 6,739,587 B2 * | 5/2004 | Migliori | B25B 5/12 269/27 |
| 6,845,975 B2 | 1/2005 | Tunkers | |
| 6,869,068 B2 * | 3/2005 | Zhao | B25B 5/06 269/228 |
| 7,367,434 B2 * | 5/2008 | Sato | B25B 5/12 188/72.1 |
| 8,136,803 B2 * | 3/2012 | McIntosh | B25B 5/122 269/140 |
| 9,550,262 B2 | 1/2017 | Fukano et al. | |
| 2001/0003388 A1 * | 6/2001 | Takahashi | B25B 5/122 269/32 |
| 2002/0158394 A1 * | 10/2002 | Sawdon | B25B 5/122 269/32 |
| 2002/0190455 A1 * | 12/2002 | Sawdon | B25B 5/122 269/32 |
| 2004/0046299 A1 * | 3/2004 | Migliori | B25B 5/12 269/32 |
| 2004/0075207 A1 * | 4/2004 | Sato | B25B 5/08 269/229 |
| 2004/0113342 A1 * | 6/2004 | Tunkers | B25B 5/12 269/32 |
| 2012/0146275 A1 * | 6/2012 | Choi | B25B 5/04 269/226 |

FOREIGN PATENT DOCUMENTS

| | | |
|---|---|---|
| EP | 1386697 A2 | 2/2004 |
| EP | 2177320 A1 | 4/2010 |
| JP | 2001-105332 A | 4/2001 |
| JP | 3644882 B2 | 5/2005 |
| JP | 2005-169604 A | 6/2005 |
| JP | 2007-125679 A | 5/2007 |
| JP | 2013-154419 A | 8/2013 |
| JP | 2014-014913 A | 1/2014 |
| JP | 5891535 B2 | 3/2016 |
| KR | 2000-0034025 A | 6/2000 |
| KR | 2003-0082230 A | 10/2003 |
| KR | 10-2012-0063778 | 6/2012 |
| KR | 10-2015-0023698 | 3/2015 |
| WO | WO-2003/047815 A1 | 6/2003 |

OTHER PUBLICATIONS

Search Report in International Application No. PCT/IB2017/055941 dated Jun. 1, 2018, 5 pages.

* cited by examiner

ELECTRICAL CLAMPING APPARATUS

PRIORITY

This application claims priority under 35 U.S.C. § 119(a) to a Korean Patent Application filed in the Korean Intellectual Property Office on Jul. 28, 2016 and assigned Serial No. 10-2016-0095811, the contents of which are incorporated herein by reference.

BACKGROUND OF THE INVENTION

Field of the Invention

The present invention relates to a clamping apparatus, and more particularly, to an electrical clamping apparatus that can stably clamp a panel by reducing an entire size using a motor as a driving source and enhancing a grip torque through an enhanced driving force transfer mechanism.

Description of the Related Art

In general, a clamping apparatus fixes not to move a panel upon performing a processing work such as cutting, plating, and welding of the panel, has a different grip torque or regulation portion according to a sectional shape of the panel in each processing work, and has a different structure.

A conventional clamping apparatus includes a locator that receives a panel, a clamp that supports the panel, an operation cylinder that generates a driving force by a pneumatic pressure or a hydraulic pressure, and a link portion that receives a driving force to rotate a clamper.

In such a clamping apparatus, when an operation pressure is supplied to the operation cylinder, while an operation load increases, the link portion is operated by the operation load, and the front end of the clamper connected to the link portion rotates by a hinge operation to clamp the panel.

However, the conventional clamping apparatus uses an operation cylinder as a power source, and when the operation cylinder and a pneumatic pressure pipe are installed, there is a drawback that a size of the clamping apparatus increases and that an operation structure thereof is complex. Further, there is a problem that a production cost of the clamping apparatus increases.

Further, in order to clamp a panel having various thicknesses, there is a problem that a driving force transfer mechanism should be controlled to change a grip torque or that a separate clamping apparatus having a driver of different outputs should be prepared.

Accordingly, development of a driving force transfer mechanism that can improve a grip torque by gripping a panel in various thicknesses by the same driving torque is required.

SUMMARY OF THE INVENTION

The present invention has been made in view of the above problems and provides an electrical clamping apparatus that can reduce an entire size using a motor as a driving source and that can largely improve a grip torque by applying a sliding crank portion and a changed toggle link portion with a driving force transfer mechanism.

In accordance with an aspect of the present invention, an electrical clamping apparatus for clamping and fixing one side of a panel includes a main body; a driving motor installed within the main body and that generates a driving force; a clamp portion that clamps or unclamps the panel; a toggle link portion connected to the clamp portion and that transfers rotatory power to the clamp portion to rotate the clamp portion; a driving force transfer portion connected to the driving motor to transfer a driving force of the driving motor to the toggle link portion; and a sliding crank portion connected to one side of the toggle link portion to convert a rotational motion of the driving force transfer portion to a linear reciprocating motion and to operate the toggle link portion in a state in which one side thereof is connected to the driving force transfer portion and in which the other side thereof is vertically bent toward the toggle link portion.

Preferably, the electrical clamping further includes a locator portion in which a locator body protruded in a horizontal direction of the main body is provided at an upper end portion of the main body to receive an end portion of the panel, wherein the locator portion further includes a locator tip protruded to an end portion of the locator body to support the panel.

Preferably, the clamp portion includes a clamp body installed in an upper portion of the main body; a pair of clamp fingers bent in a downward direction from an upper portion of both corners of one side of the clamp body to rotatably installed in the main body in order to grip the panel; a clamp tip protruded in a direction of the locator portion at the other side of the clamp body to grip the panel received in the locator portion; and a clamp hinge that rotatably connects the pair of clamp fingers to the main body.

Preferably, the driving force transfer portion includes a worm gear connected to a shaft of the driving motor to rotate by driving of the driving motor; a worm wheel supported by a shaft within the main body and installed to engage with the worm gear to rotate by interlocking with the worm gear; and a pivot bearing installed in an end portion of a shaft of the driving motor to prevent the worm gear from separating.

Preferably, the sliding crank portion includes a pair of crank arms coupled to the worm wheel by the connection shaft in a state in which one side thereof is separated by a predetermined gap in an outer circumferential direction from the center of the worm wheel; a pair of crank sliders in which the other sides of the pair of crank arms are each installed to sliding move to support the other side of the pair of crank arms; a pair of first links integrally extended to the other side of the pair of crank arms and bent toward the toggle link portion to be vertically connected to the toggle link portion; and a pair of guide grooves formed at both side surfaces of the main body to guide a movement of the crank slider.

Preferably, the guide groove has one side inclined in a downward direction toward the ground to guide a slant movement of the pair of crank sliders.

Preferably, the pair of crank arms have one side connected to the worm wheel to perform a rotational reciprocating motion and the other side connected to the crank slider to perform a rotational reciprocating motion.

Preferably, the pair of crank arms further includes a bending portion in which one side of a crank arm is bent upward in order to avoid interference with a shaft of the worm wheel when the pair of crank arms rotate.

Preferably, the toggle link portion includes a pair of second links connected to end portions of the pair of first links, respectively, to rotate about a connection portion when the pair of first links operate; and a third link connected between the pair of second links to rotate the clamp hinge according to an operation of the second link.

Preferably, in the unclamping state of the clamp portion, the pair of second links are overlapped between the pair of first links, and a portion of the third link is overlapped between a pair of second links overlapped between the pair of first links, and in a clamping state of the clamp portion, a pair of second links rotate to be a horizontal state to the pair of first links, and a third link rotates to be a vertical state to the pair of second links.

BRIEF DESCRIPTION OF THE DRAWINGS

The objects, features, and advantages of the present invention will be more apparent from the following detailed description in conjunction with the accompanying drawings, in which.

DETAILED DESCRIPTION OF EXEMPLARY EMBODIMENTS

Hereinafter, exemplary embodiments of the present invention will be described in detail with reference to the accompanying drawings. The same reference numbers are used throughout the drawings to refer to the same or like parts. Further, detailed descriptions of well-known functions and structures incorporated herein may be omitted to avoid obscuring the subject matter of the present invention.

Hereinafter, an exemplary embodiment of the present invention will be described with reference to FIGS. 1 to 10.

Figure 1:
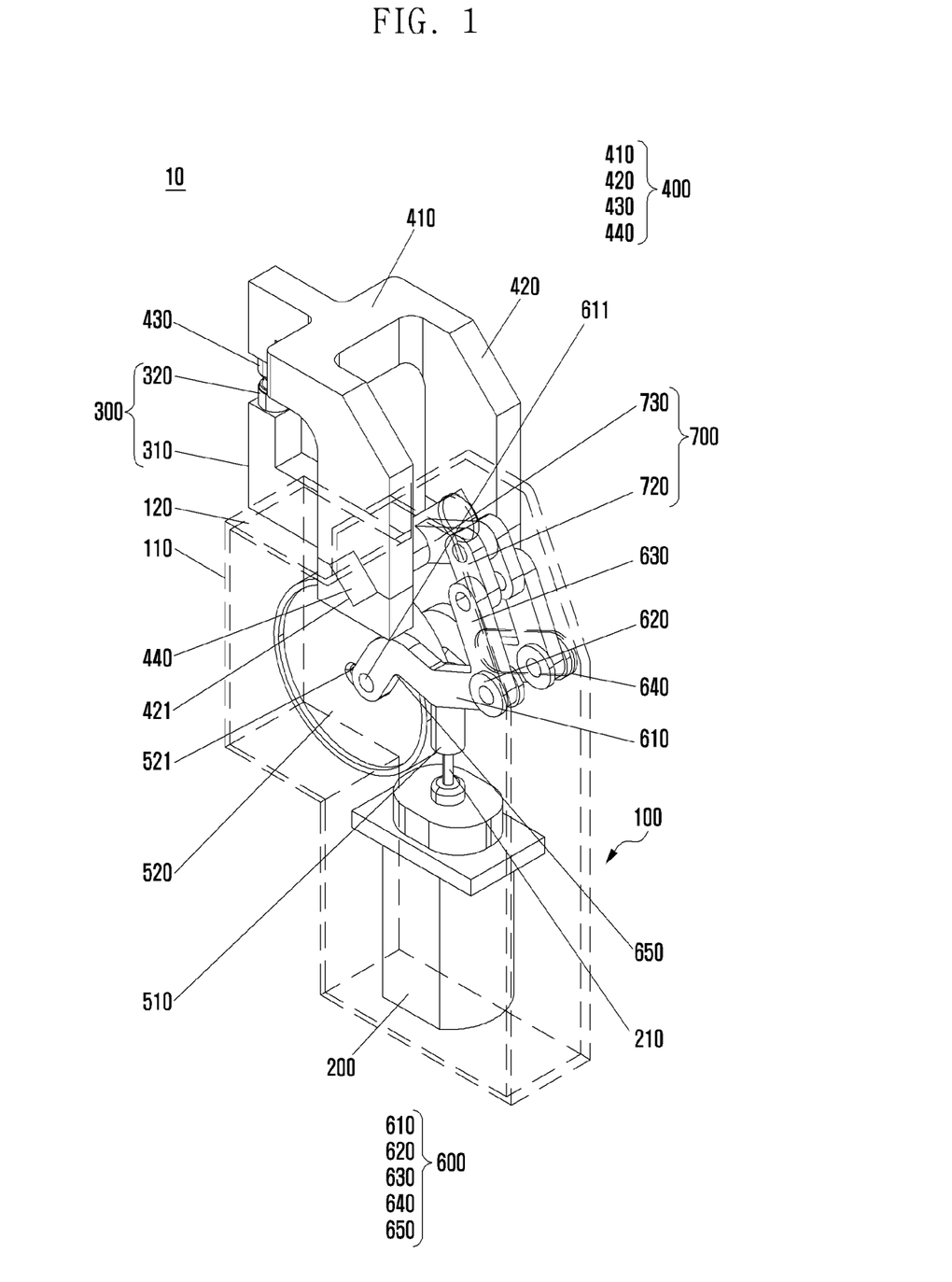
FIG. 1 is a perspective view illustrating a clamping state in a structure of an electrical clamping apparatus according to an exemplary embodiment of the present invention.
Figure 2:
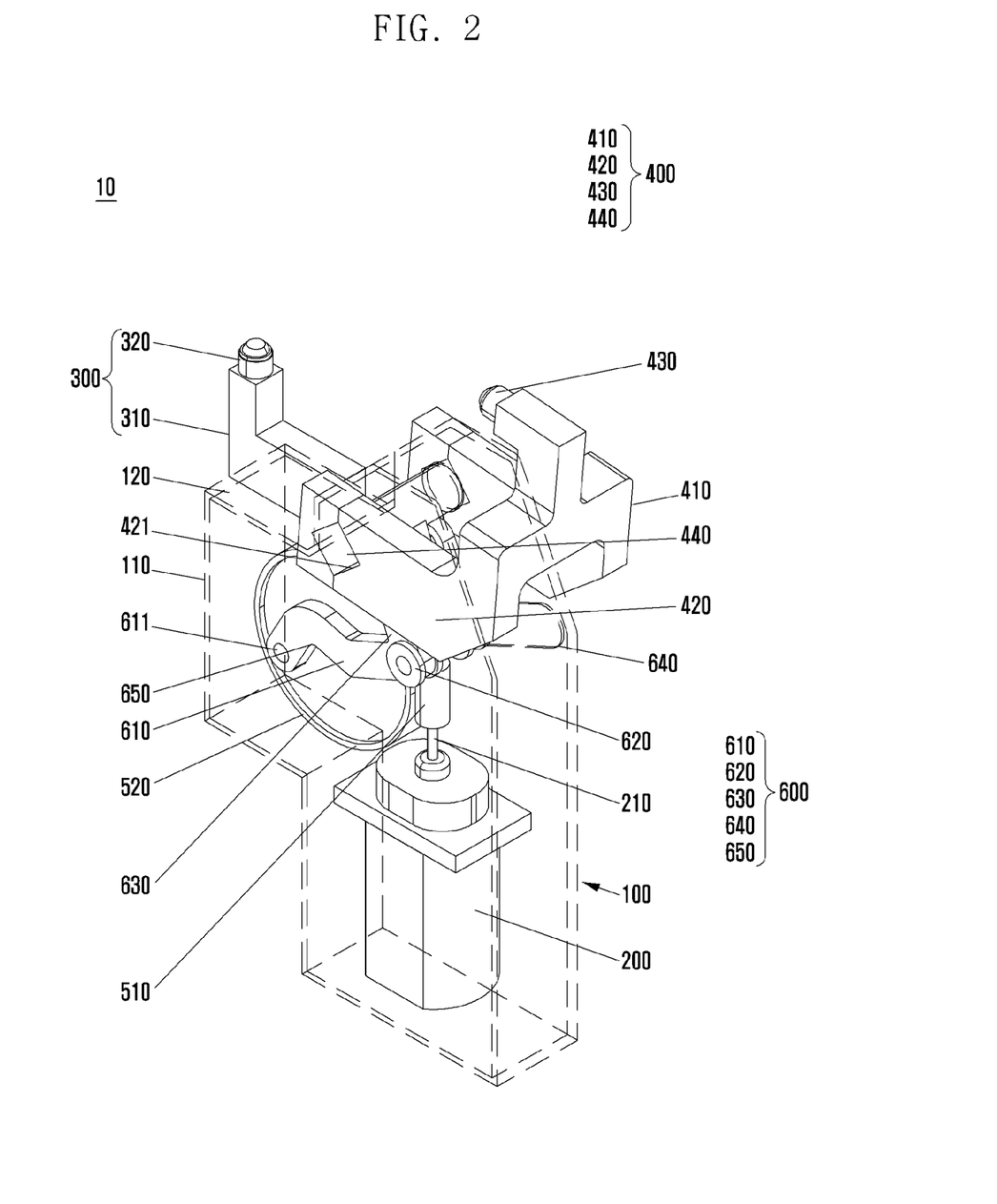
FIG. 2 is a perspective view illustrating an unclamping state in a structure of an electrical clamping apparatus according to an exemplary embodiment of the present invention.

FIG. 1 is a perspective view illustrating a clamping state in a structure of an electrical clamping apparatus according to an exemplary embodiment of the present invention, and FIG. 2 is a perspective view illustrating an unclamping state in a structure of an electrical clamping apparatus according to an exemplary embodiment of the present invention.

Figure 3:
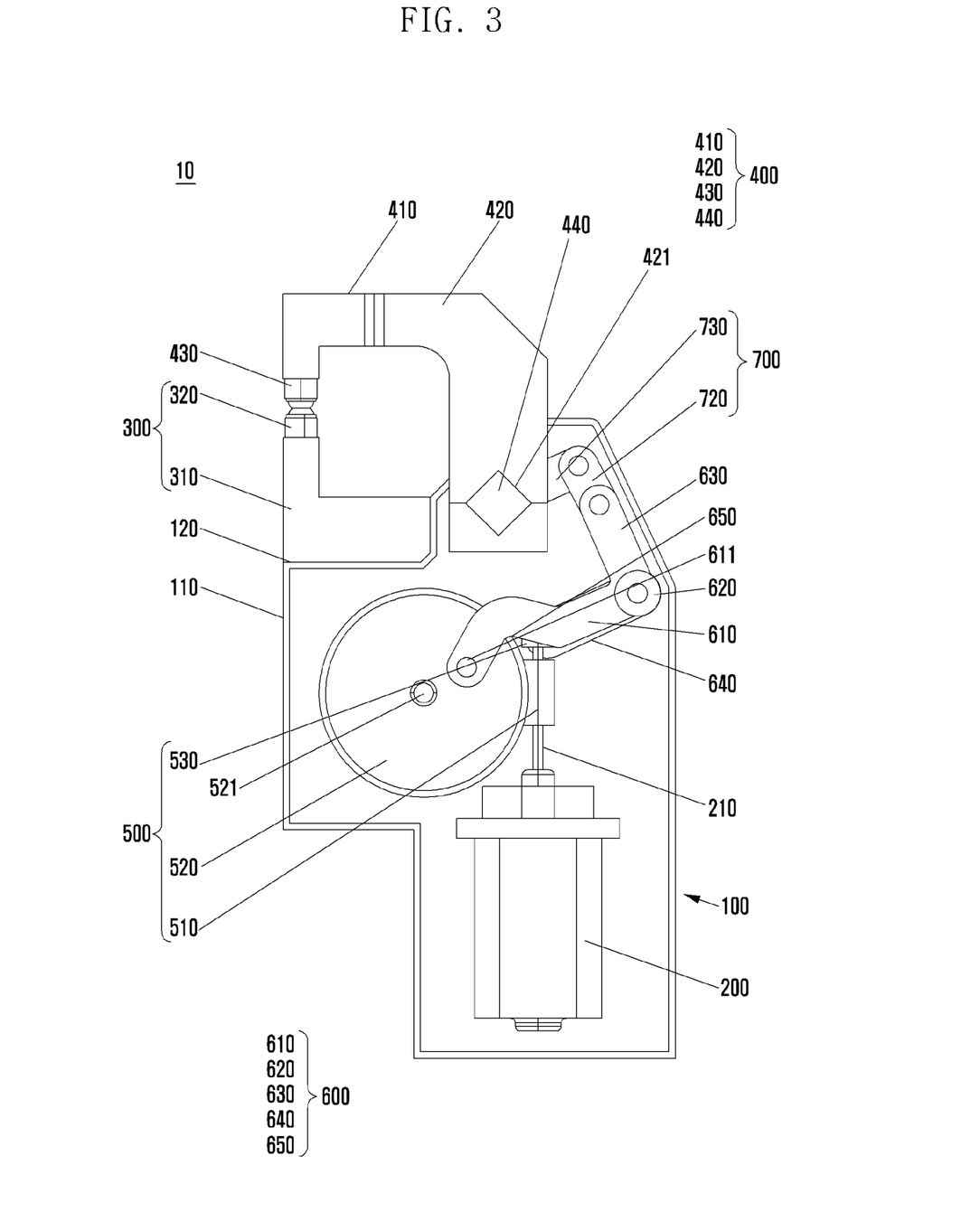
FIG. 3 is a schematic diagram illustrating a clamping state in a structure of an electrical clamping apparatus according to an exemplary embodiment of the present invention.
Figure 4:
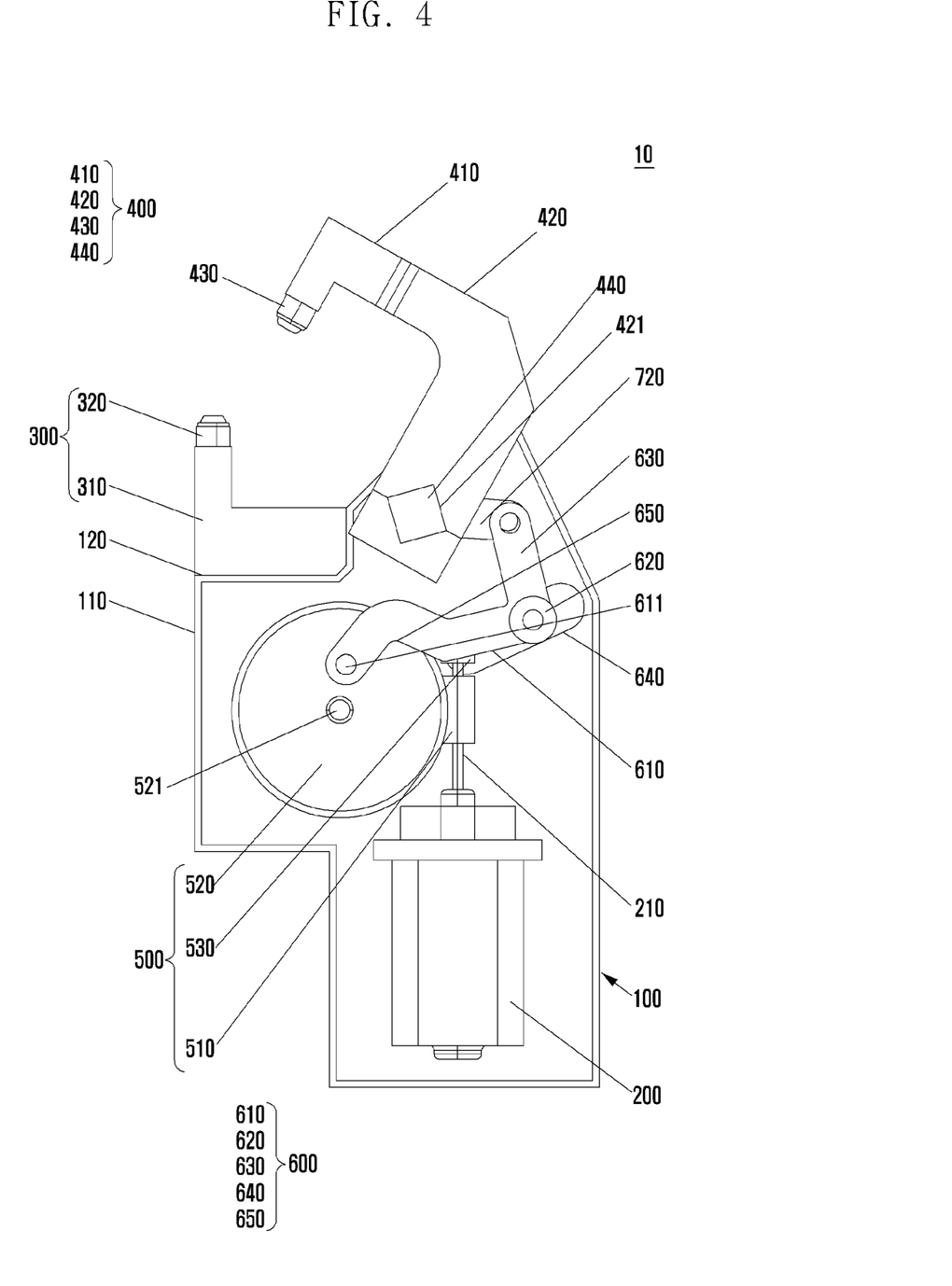
FIG. 4 is a schematic diagram illustrating an execution state of clamping in a structure of an electrical clamping apparatus according to an exemplary embodiment of the present invention.
Figure 5:
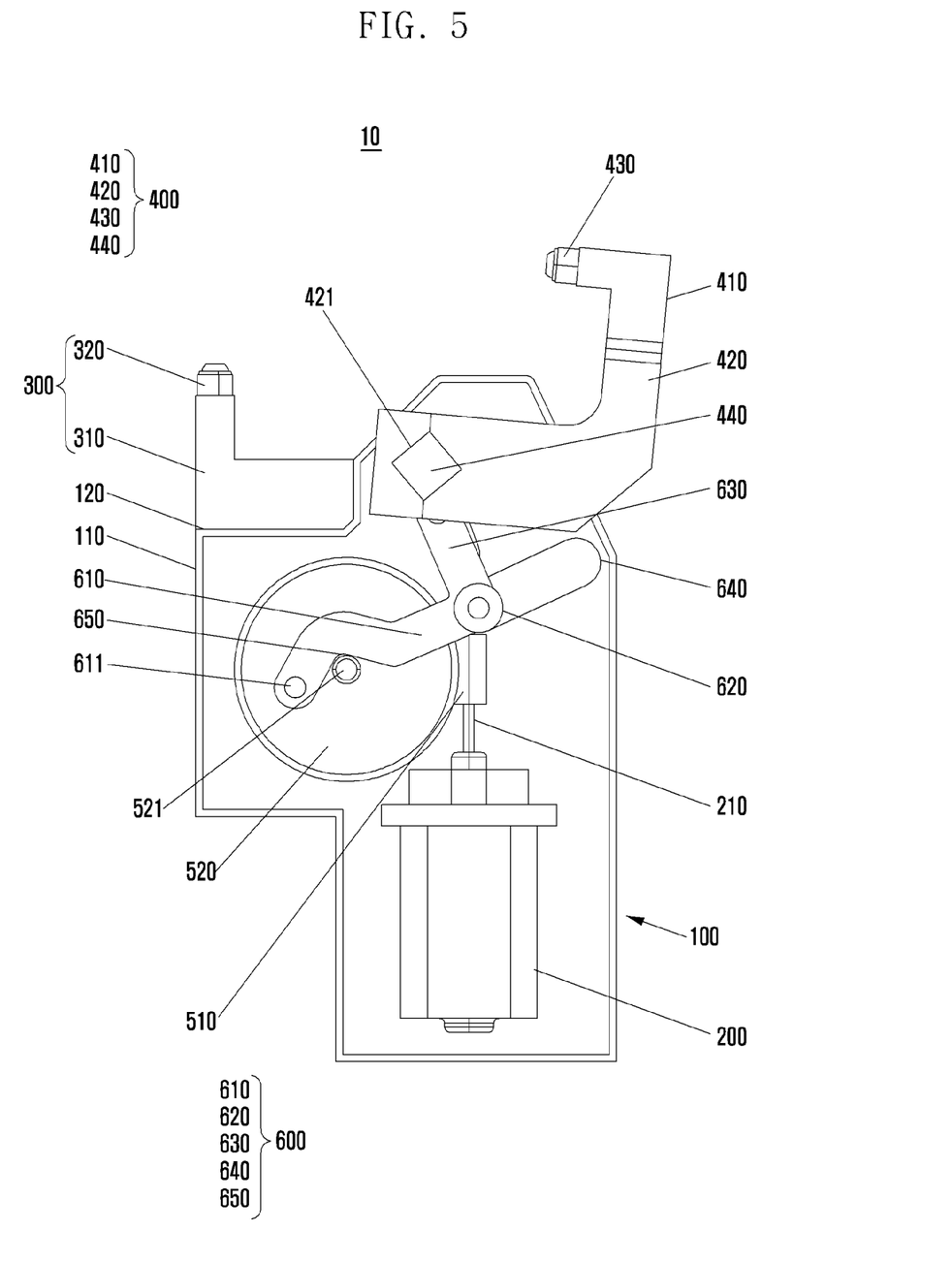
FIG. 5 is a schematic diagram illustrating a clamping state in a structure of an electrical clamping apparatus according to an exemplary embodiment of the present invention.

FIG. 3 is a schematic diagram illustrating a clamping state in a structure of an electrical clamping apparatus according to an exemplary embodiment of the present invention, FIG. 4 is a schematic diagram illustrating an execution state of clamping in a structure of an electrical clamping apparatus according to an exemplary embodiment of the present invention, and FIG. 5 is a schematic diagram illustrating a clamping state in a structure of an electrical clamping apparatus according to an exemplary embodiment of the present invention.

Figure 6A:
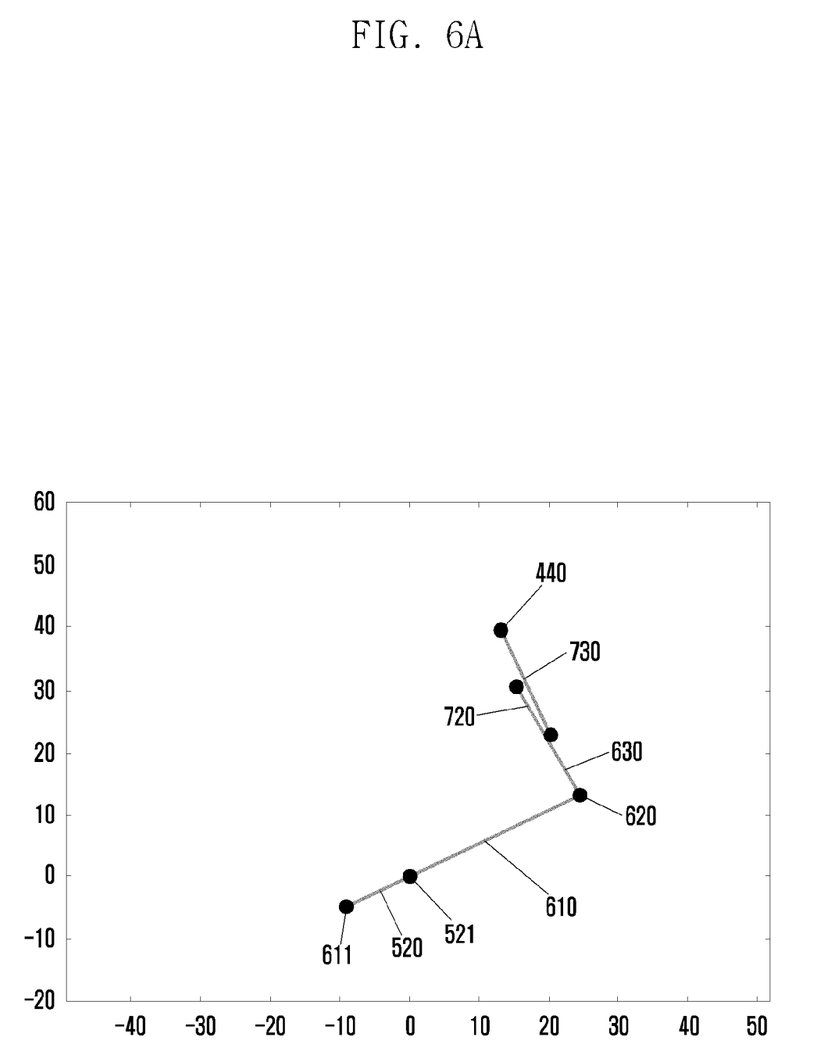
FIGS. 6A to 6C are graphs illustrating step by step an operation state of a driving force transfer mechanism according to an exemplary embodiment of the present invention.
Figure 6B:
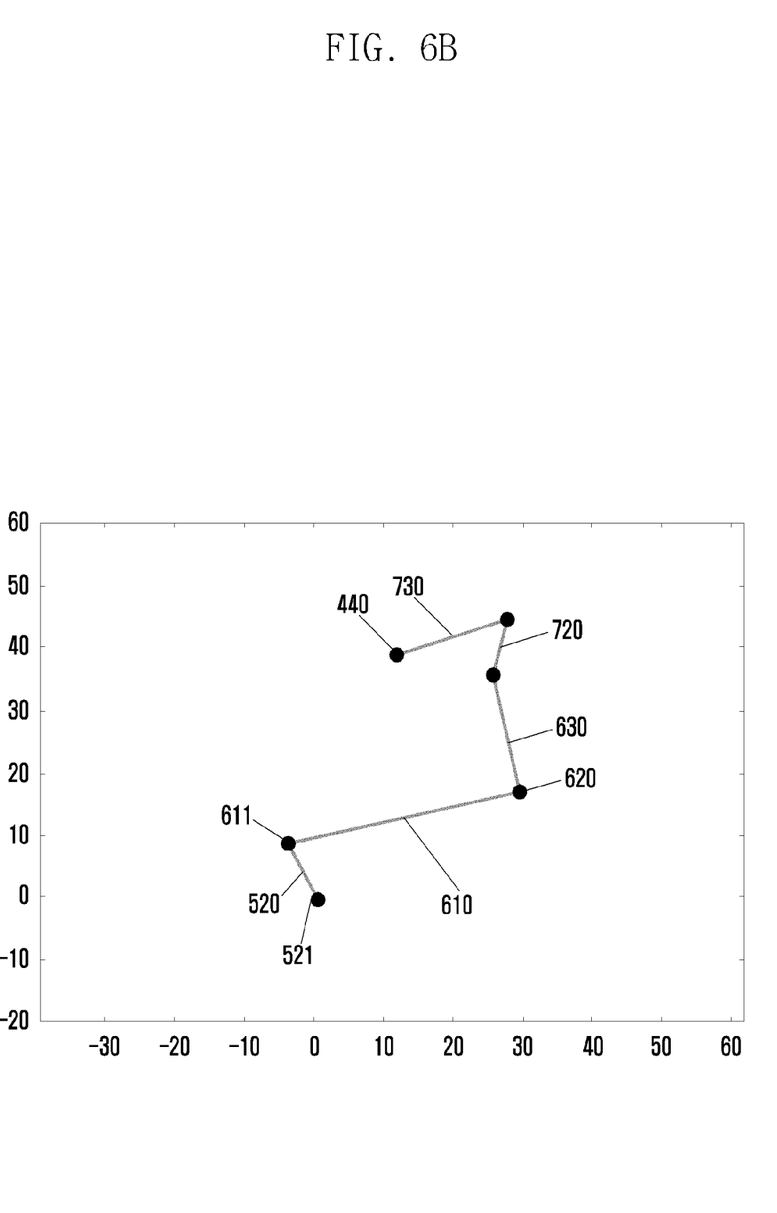
Figure 6C:
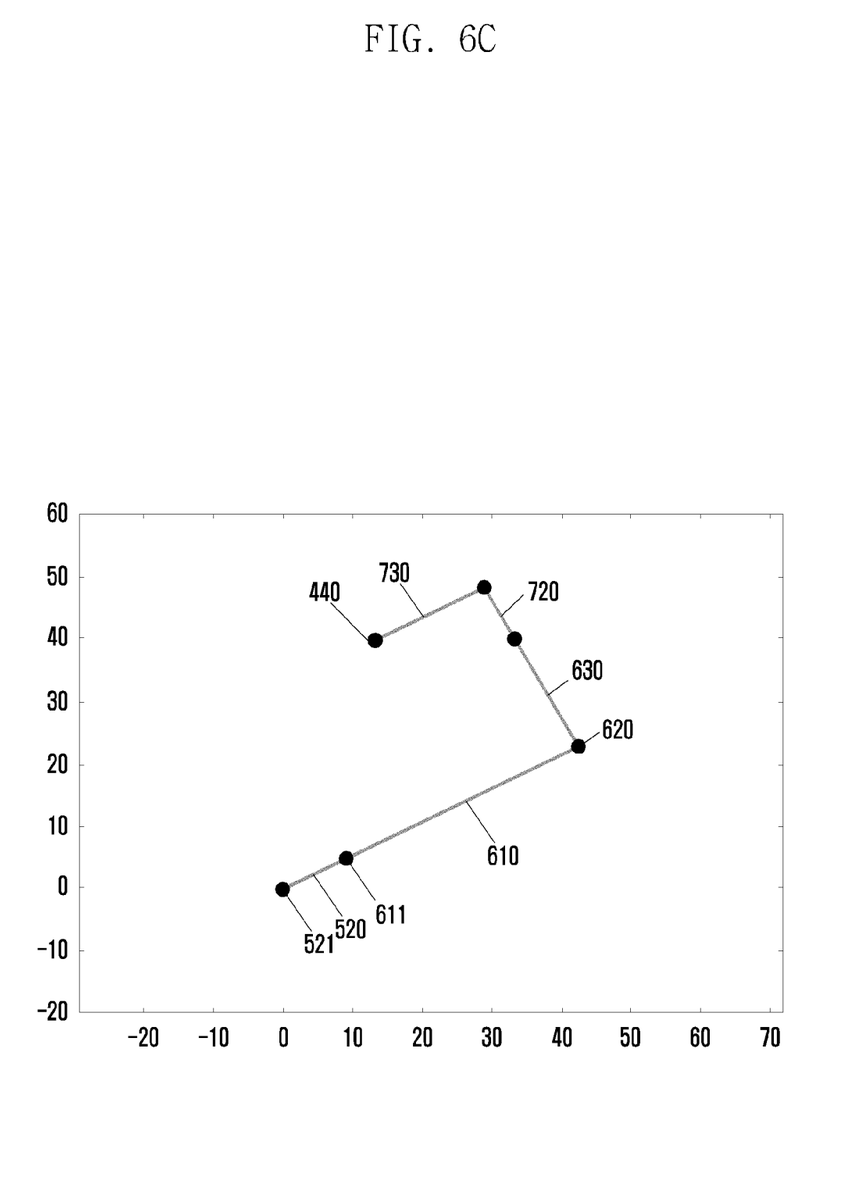
Figure 7:
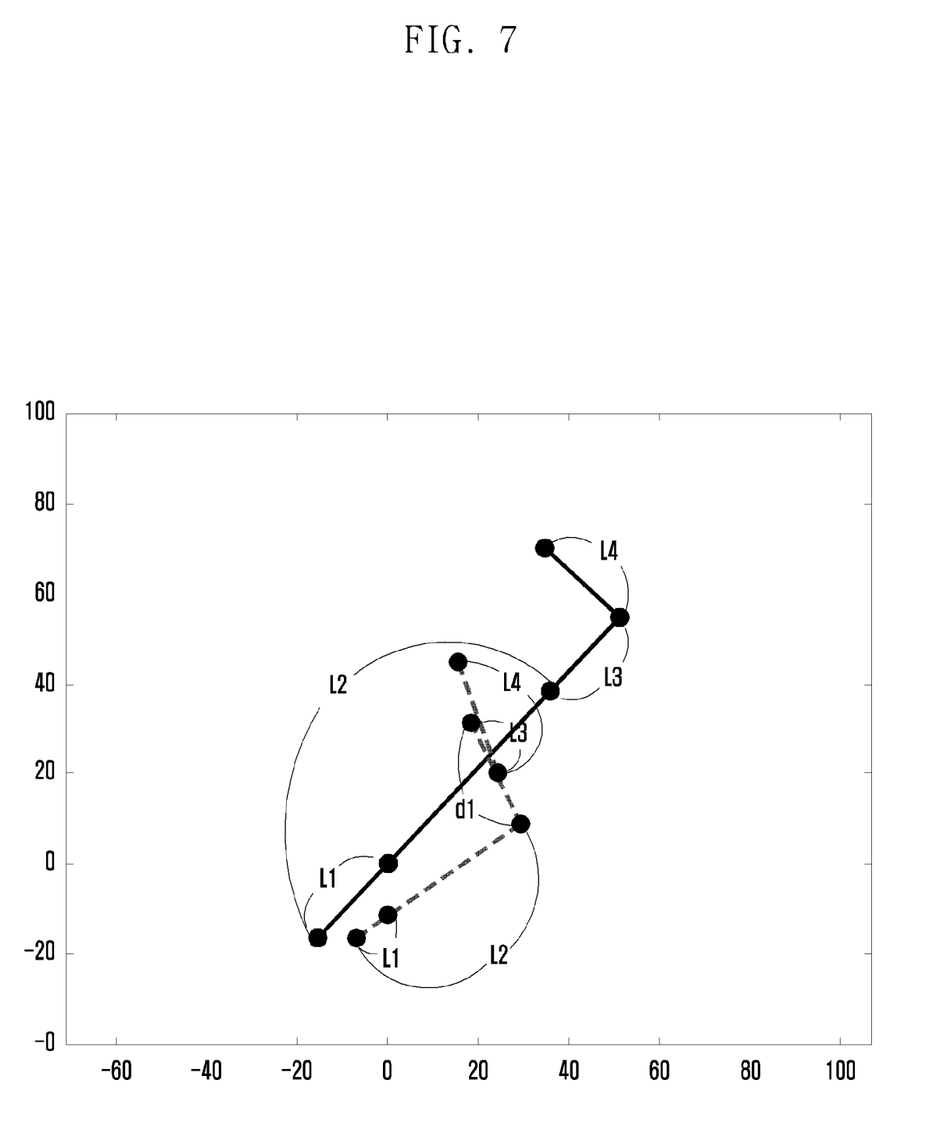
FIGS. 7 to 9 are graphs illustrating step by step an operation state of a driving force transfer mechanism before and after optimization of an electrical clamping apparatus.
Figure 8:
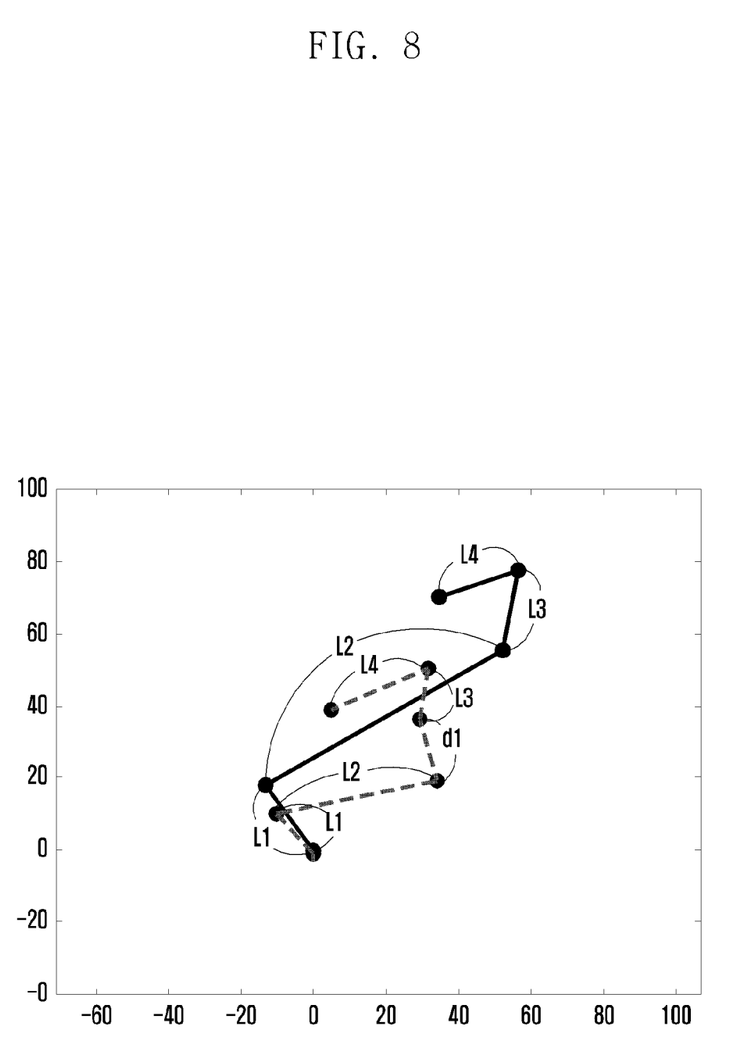
Figure 9:
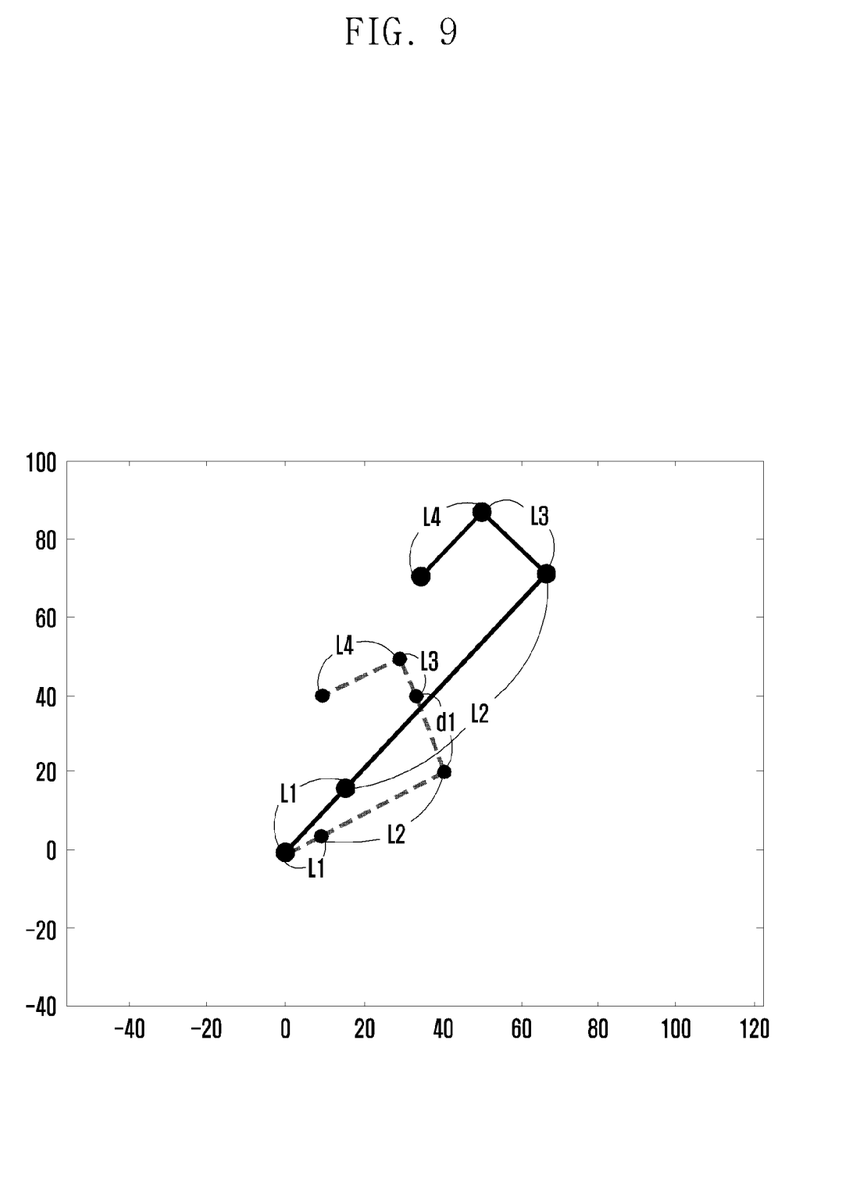
Figure 10:
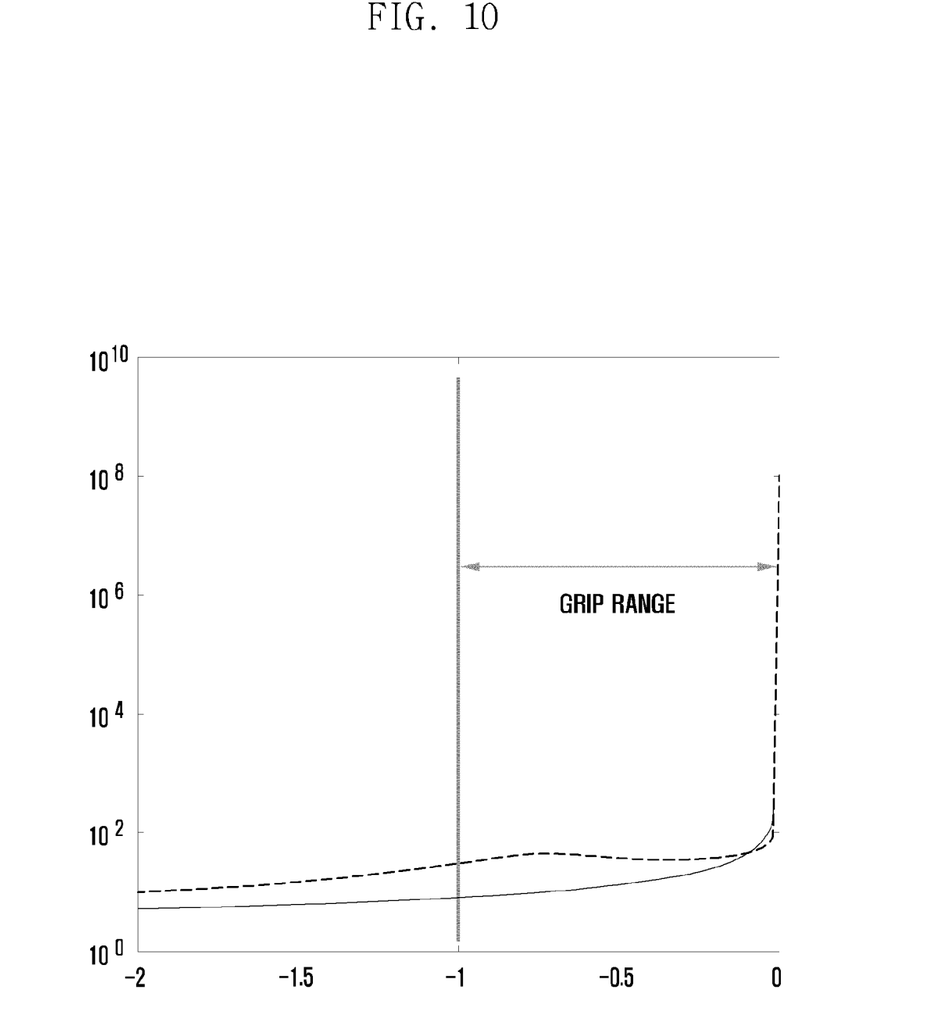
FIG. 10 is a graph comparing a grip torque before and after optimization derived through FIGS. 7 to 9.

FIGS. 6A to 6C are graphs illustrating step by step an operation state of a driving force transfer mechanism according to an exemplary embodiment of the present invention, FIGS. 7 to 9 are graphs illustrating step by step an operation state of a driving force transfer mechanism before and after optimization of an electrical clamping apparatus, and FIG. 10 is a graph comparing a grip torque before and after optimization derived through FIGS. 7 to 9.

As shown in FIGS. 1 and 2, an electrical clamping apparatus 10 according to an exemplary embodiment of the present invention may include a main body 100, driving motor 200, clamp portion 400, toggle link portion 700, force transfer portion 500, and sliding crank portion 600.

In this case, an electrical clamping apparatus according to an exemplary embodiment of the present invention may further include a locator portion 300. The locator portion 300 may be installed or may not be installed according to a kind and a size of a panel.

The main body 100 is formed in a quadrangular-shaped box body, at one side of the main body 100, a protruding portion 110 is formed to install the worm wheel 520 to be described later within the main body 100, and in an upper portion of the main body 100, a receiving portion 120 that receives the locator portion 300 is formed.

The driving motor 200 is installed within the main body 100 and is rotatably driven by an input electric signal. In this case, the driving motor 200 is installed in a vertical direction within the main body 100, and a shaft of the driving motor 200 is disposed toward an upper portion of the main body 100. As the driving motor 200, a servomotor that can minutely adjust the rotation number may be used.

As the driving motor 200, various kinds of motors such as a direct current (DC) motor, alternating current (AC) motor, induction motor, and brushless motor may be used.

The locator portion 300 is installed in the receiving portion 120 formed at an upper end portion of the main body 100, and an end portion of a panel (not shown) is received in the locator portion 300. Such a locator portion 300 may include a locator body 310.

The locator body 310 is formed in an approximately "L" shape to be protruded in a horizontal direction by a predetermined length in the main body 100, and such a locator body 310 may be integrally produced with the main body 100 or may be separately produced from the main body 100 to be coupled to the main body 100.

Further, the locator portion 300 may further include a locator tip 320 protruded from an end portion of the locator body 310 to support the panel.

In this case, although the locator tip 320 is not shown, the locator tip 320 may be detachably installed by a screw fastening structure and may be installed to adjust a height by a rotation of a screw fastening structure according to a panel form.

An end portion of the locator tip 320 directly contacts a lower surface of the panel, and it is preferable that the panel is made of an elastic material while being formed in a round shape in order to prevent a scratch from occurring at a lower surface of the panel when the panel is received.

The clamp portion 400 performs a function of clamping or unclamping the panel received in the locator tip 320 of the locator portion 300, and such a clamp portion 400 may include a clamp body 410, a pair of clamp fingers 420, a clamp tip 430, and a clamp hinge 440.

The clamp body 410 is installed at an upper portion of the main body 100 while forming an external shape of the clamp portion 400. In this case, a pair of clamp fingers 420 are bent in a downward direction from both corners of one side of the clamp body 410 to be rotatably installed in the main body 100 in order to grip the panel.

Further, the clamp tip 430 is protruded in a direction of the locator tip 320 at the other side of the clamp body 410 to grip the panel received in the locator tip 320. In this case, although not shown, the clamp tip 430 may be detachably installed by a screw fastening structure, and as the clamp tip 430 is detachably installed, when the clamp tip 430 is broken and abraded, only the clamp tip 430 may be easily exchanged.

Further, an end portion of the clamp tip 430 directly contacts an upper surface of the panel, as in an end portion of the locator tip 320, and in order to prevent a scratch from occurring at an upper surface of the panel when gripping the panel, it is preferable that the end portion of the clamp tip 430 is made of an elastic material while being formed in a round shape, as in the end portion of the locator tip 320.

Both ends of the clamp hinge 440 are formed in a rectangular-shaped cross-section, and a corner portion of the lower end of a pair of clamp fingers 420 is rotatably connected to the main body 100 through the clamp hinge 440. In this case, in a pair of clamp fingers 420, a quadrangular hole 421 is provided to couple the clamp hinge 440.

As shown in FIGS. 3 to 5, a driving force transfer portion 500 according to an exemplary embodiment of the present invention is connected to the driving motor 200 to perform a function of transferring a driving force of the driving motor 200 to the toggle link portion 700 to be described later. Such a driving force transfer portion 500 may include a worm gear 510, worm wheel 520, and pivot bearing 530.

The worm gear 510 is connected to a shaft of the driving motor 200 within the main body 100 to be rotated by driving of the driving motor 200, the worm wheel 520 is engaged with the worm gear 510 to rotate by interlocking with the worm gear 510, and the pivot bearing 530 is installed in an end portion of a shaft of the driving motor 200 to prevent the worm gear 510 from being separated from a shaft of the driving motor 200.

In this case, the worm wheel 520 is disposed at a protruding portion 110 side of the main body 100, is installed to be a vertical state to the worm gear 510, and a screw thread (not shown) is formed at an outer circumferential surface to engage with the worm gear 510 and to receive a rotate driving force from the worm gear 510 to be rotation driven.

In an electrical clamping apparatus according to an exemplary embodiment of the present invention, in order to transfer a driving force of a driving motor, a driving force transfer portion is installed, but any configuration that can transfer rotatory power of a driving motor is available and the driving force transfer portion is not limited. For example, a structure of a bevel gear and a spur gear rotated by various motors may be applied.

One side of the sliding crank portion 600 according to an exemplary embodiment of the present invention is connected to the driving force transfer portion 500 and the other side thereof is connected to one side of the toggle link portion 700 in a vertically bent state toward the toggle link portion 700 to convert a rotational motion of the driving force transfer portion 500 to a linear reciprocating motion and to operate the toggle link portion 700. Such a sliding crank portion 600 may include a pair of crank arms 610, a pair of crank sliders 620, a first link 630, and a guide groove 640.

One side of a pair of crank arms 610 is coupled to the worm wheel 520 by a connection shaft 611 in a state separated by a predetermined gap in an outer circumferential direction from the center of the worm wheel 520. In this case, a portion connected to the worm wheel 520 and a pair of crank arms 610 are interlocked according to a forward and backward rotation of the worm wheel 520 to be rotated in the same direction.

A pair of crank arms 610 may further include a bending portion 650 in which one side of the pair of crank arms 610 is bent upward in order to avoid interference with a shaft 521 of the worm wheel 520 when the pair of crank arms 610 rotate.

More specifically, the worm wheel 520 rotates in a state supported and fixed to the main body 100 by the worm wheel shaft 521 installed at the center. In this case, when the worm wheel 520 rotates counterclockwise, the pair of crank arms 610 interlocked with the worm wheel 520 rotate counterclockwise about the worm wheel shaft 521. In this case, when the pair of crank arms 610 move about the worm wheel shaft 521 by a rotation, a bending portion 650 may rotate to the outside of the worm wheel shaft 521 to move without interference of the worm wheel shaft 521.

A pair of crank sliders 620 are installed to slide at the other side of the pair of crank arms 610, respectively, to support the other side of the pair of crank arms 610. In this case, at the other side of a pair of crank arms 610, a coupling hole (not shown) is formed to couple the crank slider 620.

A pair of crank sliders 620 very much receive a load of the toggle link portion 700 to be described later, and a cylindrical-shaped needle bearing may be used to endure a load of the toggle link portion 700.

Here, one side of the pair of crank arms 610 is connected to the worm wheel 520 to rotate according to a rotation of the worm wheel 520 and to perform a rotational reciprocating motion, and the other side thereof is connected to the pair of crank sliders 620 to perform a rotational reciprocating motion.

A pair of first links 630 are integrally extended at the other side of the pair of crank arms 610 and is connected vertically to the toggle link portion 700 in a state bent toward the toggle link portion 700 to move together with a pair of crank arms. The pair of first links 630 may be integrally formed in an oblique line direction at the other side of a crank arm according to a size of the electrical clamping apparatus 10 and a structure of a driving force transfer mechanism.

A pair of guide grooves 640 are formed at both side surfaces of the main body 100 to guide a movement of a pair of crank sliders 620.

In an exemplary embodiment of the present invention, one side of the guide groove 640 is formed to slant in a downward direction toward the ground to guide a slant movement of a pair of crank sliders 620. The guide groove may be formed in a form having a horizontal angle, a vertical angle, and a specific angle according to a size of the electrical clamping apparatus 10 and a structure of a driving force transfer mechanism.

More specifically, when the other side of a pair of crank arms 610 performs a rotational reciprocating motion, a pair of crank sliders 620 connected to the other side of the crank arm 610 move along a pair of guide grooves 640 of an inclined form. In this case, when the crank slider 620 moves in an inclined upward direction of a pair of guide grooves 640, by applying a push force to the toggle link portion 700, the clamp portion 400 rotates to be a clamping state, and in contrast, when the crank slider 620 moves in an inclined downward direction of a pair of guide grooves 640, by applying a force pulling to the toggle link portion 700, the crank slider 620 rotates such that the clamp portion 400 becomes an unclamping state.

The toggle link portion 700 according to an exemplary embodiment of the present invention is connected to the clamp portion 400 and transfers rotatory power to the clamp portion 400 to perform a function of rotating the clamp portion 400. Such a toggle link portion 700 may include a pair of second link 720 and third link 730.

The pair of second links 720 are connected to an end portion of a pair of first links 630 to rotate about a connection portion when the pair of first links 630 operate.

The third link is connected between the pair of second links 720 to rotate the clamp hinge 440 according to operation of the second link 720.

FIGS. 6A to 6C are graphs illustrating an operation state of a toggle link portion of a driving force transfer mechanism according to an exemplary embodiment of the present invention.

In this case, as shown in FIG. 6A, in order to grip the panel, in an unclamping state of the toggle link portion 700, a pair of second links 720 are in an overlapped state between a pair of first links 630, and a portion of the third link 730 is in an overlapped state between a pair of second links 720 overlapped between a pair of first links 630.

Further, as shown in FIGS. 6B and 6C, in a clamping state for gripping the panel, a pair of second links 720 rotate to be a horizontal state to a pair of first links 630, the third link 730 rotates to be a vertical state to a pair of second links 720; thus, the second link 720 becomes a horizontal state to a pair of first links 630, and the third link 730 becomes a vertical state to the second link 720.

A grip torque is inversely proportional to an angular speed of the clamp finger 420 and an angular speed of the driving motor 200. That is, as an angular speed of the clamp finger 420 reduces, compared with an angular speed of the driving motor 200, a grip torque increases. That is, in an electrical clamping apparatus according to an exemplary embodiment of the present invention, a pair of crank arms 610 and a pair of first links 630 are integrally formed in a shape "⌐", by reducing an angular speed transferred to the clamp finger 420 to the maximum by applying a driving force transfer mechanism of a structure in which a portion of a third link is overlapped and in which the second link 720 is overlapped with the first link 630, a grip torque can be thus improved.

With reference to FIGS. 7 to 10, a comparison structure before and after optimization of a driving force transfer mechanism of the electrical clamping apparatus is described as follows. In this case, a structure before optimization represents a structure of a general driving force transfer mechanism, and a structure after optimization represents a structure of a driving force transfer mechanism according to an exemplary embodiment of the present invention.

In this case, FIG. 7 is a graph illustrating a schematic structure of a driving force transfer mechanism before and after optimization of an unclamping state, FIG. 8 is a graph illustrating a schematic structure of a driving force transfer mechanism before and after optimization while clamping is performed, and FIG. 9 is a graph illustrating a schematic structure of a driving force transfer mechanism before and after optimization of a clamping state. In this case, a unit of a horizontal axis and a vertical axis is mm and represents a length of each element.

In this case, a portion indicated by a solid line represents a structure of a driving force transfer mechanism before optimization, and a portion indicated by a dotted line represents a state of a driving force transfer mechanism after optimization.

Here, L1 before optimization indicated by a solid line represents a length from a worm wheel shaft to a connection shaft of a clamp arm, L2 represents a length of a clamp arm, L3 represents a length of a second link, and L4 represents a length of a third link.

Further, L1 after optimization indicated by a dotted line represents a length from the worm wheel shaft 521 to the connection shaft 611 of the clamp arm 610, L2 represents a length of the clamp arm 610, d1 represents a length of the first link 630 integrally formed in a vertical direction to the clamp arm 610, L3 represents a length of the second link 720, and L4 represents a length of the third link 730.

Here, L1-L4 and d1 represent a length of each element of a driving force transfer mechanism, but hereinafter, for convenience of description, L1-L4 and d1 will be described by replacing with each element.

With reference to FIG. 7, in an unclamping state before optimization, L1 is in a horizontal state with overlapped about L2, L3 is in a horizontal state on an extension line of L2, and L4 is in a vertical state to L3. In this case, in an unclamping state after optimization, L1 is in a horizontal state with overlapped with L2, d1 is in a vertical state to L2, L3 is in a state overlapped adjacent to horizontal to d1, and L4 is in a state partially overlapped adjacent to horizontal to d1 and L3.

With reference to FIG. 8, in a state in which clamping is performed before optimization, L1 is rotated, L2 is moved by L1, L3 is rotated by L2, and L4 is rotated by L3. In this case, in a state in which clamping is performed after optimization, L1 is rotated, L2 and d1 vertically formed integrally with L2 are together moved by L1, L3 overlapped with d1 is rotated by d1, and L4 overlapped with d1 and L3 is rotated by L3.

With reference to FIG. 9, in a clamping state before optimization, as L1 is rotated and L2 is moved by L1, L2 is horizontal to L1, as L3 is rotated by L2, L3 is horizontal to L2, and as L4 is rotated by L3, L4 becomes vertical to L3. In this case, in a clamping state after optimization, L1 is rotated and L2 and d1 vertically connected to L2 are moved by L1; thus, L2 becomes horizontal to L1, d1 becomes continuously vertical to L2, L3 is rotated by a movement of L2 and d1 to be horizontal to d1, and L4 is rotated by L3 to be vertical to L3.

In an operation process of a driving force transfer mechanism described through FIGS. 7 to 9, upon unclamping in a structure after optimization, compared with a structure before optimization, by enhancing in a structure in which L2 and L3 are overlapped with d1, a size of a configuration of a driving force transfer mechanism can be reduced; thus, a size of an entire apparatus can be minimized.

Further, while clamping is performed, L2 and d1 are integrally formed and moved and rotate in a state in which L2 and L3 are overlapped; thus, an angular speed transferred to a clamp finger is reduced, compared with an angular speed of a driving motor; thus, a grip torque is enhanced.

FIG. 10 is a graph of a grip torque state derived by applying each of structures of a driving force transfer mechanism before and after optimization. In this case, a portion indicated by a solid line represents a grip torque before optimization, and a portion indicated by a dotted line represents a grip torque after optimization.

Here, a vertical axis of the graph represents a grip torque with a log scale, a length horizontal axis represents an angle in which a clamp tip is separated from a locator tip, and 0° of a right horizontal axis of the graph represents a contact state of the locator tip and the clamp tip.

In this case, a thickness range of a grip target panel, which is a design target value is set to within 1 mm (the same as a separated angle 1° in a clamping state), and a value obtained through a value measured based on a torque 3 Nm of a driving motor when a length of a clamp finger is 60 mm is represented.

For example, when a driving torque 3 Nm is applied within a grip range of a panel thickness of 1 mm, i.e., within an angle range of 1° of a clamp finger, a grip torque before optimization was derived to approximately 24.3 Nm value and a grip torque after optimization was derived to approximately 99.6 Nm value; thus, it may be determined that a grip torque after optimization was remarkably improved, compared with that before optimization.

Table 1 represents a state in which a grip torque and an opening and closing angle are enhanced in a length change and a driving force transfer mechanism of each element before and after optimization.

TABLE 1

|  | (mm) | (mm) | (mm) | (mm) | (mm) | Grip torque (Nm) | Opening and closing angle |
|---|---|---|---|---|---|---|---|
| Before optimization | 22.5 | 75.0 | 22.5 | 22.5 | — | 24.3 | 90 |
| After optimization | 10.2 | 38.0 | 9.0 | 18.0 | 19.7 | 99.6 | 94 |

In Table 1, by a structure in which a pair of first links 630 are integrally formed in a vertical state in a pair of crank arms 610 after optimization and a length change of L1 to L4 and d1, it may be determined that a grip torque after optimization is enhanced further by approximately 4 times or more than that before optimization and that a maximum separation angle is largely increased in an unclamping state.

Hereinafter, operation of the electrical clamping apparatus 10 according to an exemplary embodiment of the present invention having the above-described configuration will be described in detail.

First, in order to receive the panel in the locator tip 320 of the locator portion 300, by rotating the driving motor 200, the clamp portion 400 rotates upward.

In this case, when the driving motor 200 is operated, the worm gear 510 connected to the driving motor 200 rotates in the same rotation direction as that of the driving motor 200, and the worm wheel 520 connected to the worm gear 510 rotates a backward direction, i.e., counterclockwise of the worm gear 510.

Simultaneously, in a pair of crank arms 610 connected to the worm wheel 520 by the connection shaft 611, one side connected to the worm wheel 520 rotates in the same direction as that of the worm wheel 520, and the other side connected to a pair of crank sliders 620 moves in a linear direction. In this case, one side connected to a pair of crank arms 610 rotates without interference with the worm wheel shaft 521 by a bending portion 650, and the other side connected to a pair of crank sliders 620 moves downward by guide of a pair of guide grooves 640 in which a pair of crank sliders 620 are inclined.

Simultaneously, a pair of first links 630 integrally formed with a pair of crank arms 610 move downward in a state vertical to the other side of a pair of crank arms 610 and rotate a pair of second links 720 connected to a pair of first links 630.

In this case, a pair of second links 720 are rotated about a portion connected to a pair of first links 630 to be rotated to overlap between a pair of first links 630.

Simultaneously, the third link 730 connected to a pair of second links 720 rotates about a portion connected to a pair of second links 720; thus, a portion of the third link 730 is rotated to overlap between a pair of first links 630 together with a pair of second links 720.

Simultaneously, the clamp hinge 440 connected to the third link 730 rotates counterclockwise, and when the clamp hinge 440 rotates, a pair of clamp fingers 420 connected to the clamp hinge 440 rotate upward about the main body 100. Thereby, the clamp tip 430 connected to a pair of clamp fingers 420 may be separated from the locator tip 320 to receive a panel in the locator tip 320.

After the panel is received in the locator tip 320, the driving motor 200 rotates in a backward direction.

When the driving motor 200 rotates in a backward direction, the worm gear 510 connected to the driving motor 200 rotates, and the worm wheel 520 connected to the worm gear 510 rotates clockwise.

In this case, one side of a pair of crank arms 610 connected to the worm wheel 520 rotates to return to an original position, and a pair of crank sliders 620 connected to the other side of the pair of crank arms 610 move upward by guide of a pair of guide grooves 640.

In this case, a pair of first links 630 integrally formed with a pair of crank arms 610 are moved in a vertical state to the pair of crank arms 610, and a pair of second links 720 connected to the pair of first links 630 rotate to release an overlapped state between a pair of first links 630 and becomes a horizontal state to the pair of first links 630. Simultaneously, the third link 730 connected to a pair of second links 720 rotates to be a vertical state to a pair of second links 720.

Simultaneously, the clamp hinge 440 connected to the third link 730 rotates clockwise, and when the clamp hinge 440 rotates, a pair of clamp fingers 420 connected to the clamp hinge 440 rotate downward about the main body 100. Thereby, the clamp tip 430 connected to a pair of clamp fingers 420 is moved to the locator tip 320 to clamp a panel received in the locator tip 320.

As described above, by an electrical clamping apparatus according to an exemplary embodiment of the present invention, by using a driving motor as a driving source, upon applying a conventional operation cylinder, a separate pneumatic pressure or hydraulic pressure supply apparatus can be removed, except for a connection pipe for supplying a pneumatic pressure or a hydraulic pressure and a power supply source; thus, an apparatus size can be reduced to the maximum.

Further, according to the present invention, by applying a toggle link portion and a sliding crank portion formed in an overlap structure sliding moved with a driving force transfer mechanism that rotates a clamp finger, a grip torque can be remarkably improved.

In this case, because a first link is integrally formed with a crank arm in a vertical direction to the crank arm, the first link can be moved together with the crank arm; thus, an angular speed transferred to a clamp finger can be reduced to the maximum; thus, a more improved grip torque can be provided with the same driving torque that as of a conventional case.

Further, according to the present invention, because a stroke can be accurately adjusted through a driving force transfer portion configured with a worm gear and a worm wheel, a constant grip torque is provided; thus, a scratch can be prevented from occurring in a clamped panel and marketability can be improved.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

[Description of symbols]

| | |
|---|---|
| 100: main body | 110: protruding portion |
| 120: receiving portion | 200: driving motor |
| 210: driving motor shaft | 300: locator portion |
| 310: locator body | 320: locator tip |
| 400: clamp portion | 410: clamp body |
| 420: clamp finger | 430: clamp tip |
| 440: clamp hinge | 500: driving force transfer portion |
| 510: worm gear | 520: worm wheel |
| 530: pivot bearing | 600: sliding crank portion |
| 610: crank arm | 611: connection shaft |
| 620: crank slider | 630: first link |
| 640: guide groove | 640: bending portion |
| 700: toggle link portion | 720: second link |
| 730: third link | |

What is claimed is:

1. An electrical clamping apparatus for clamping and fixing one side of a panel, the electrical clamping apparatus comprising:
   a main body;
   a driving motor installed within the main body and that generates a driving force;
   a clamp portion that clamps or unclamps the panel;
   a toggle link portion connected to the clamp portion and that transfers rotatory power to the clamp portion to rotate the clamp portion;
   a driving force transfer portion connected to the driving motor to transfer a driving force of the driving motor to the toggle link portion; and
   a sliding crank portion connected to one side of the toggle link portion to convert a rotational motion of the driving force transfer portion to a linear reciprocating motion and to operate the toggle link portion in a state in which one side thereof is connected to the driving force transfer portion and in which the other side thereof is vertically bent toward the toggle link portion, wherein the sliding crank portion comprises:
   a pair of crank arms coupled to the driving force transfer portion at a first end of the crank arms;
   a pair of crank sliders installed at a second end of the crank arms to be supported by and slide within the main body;
   a pair of first links integrally extending from the second end of the pair of crank arms and bent toward the toggle link portion to be vertically connected to the toggle link portion; and
   a pair of guide grooves formed at opposed side surfaces of the main body to guide movement of the crank sliders, wherein the guide grooves have one side inclined in a downward direction toward the ground to guide a slant movement of the pair of crank sliders.

2. The electrical clamping apparatus of claim 1, further comprising a locator portion in which a locator body protruded in a horizontal direction of the main body is provided at an upper end portion of the main body and that receives an end portion of the panel, wherein the locator portion further comprises a locator tip protruded to an end portion of the locator body to support the panel.

3. The electrical clamping apparatus of claim 2, wherein the clamp portion comprises:
   a clamp body installed in an upper portion of the main body;
   a pair of clamp fingers bent in a downward direction from an upper portion of both corners of one side of the clamp body to be rotatably installed in the main body in order to grip the panel;
   a clamp tip protruded in a direction of the locator portion at the other side of the clamp body to grip the panel received in the locator portion; and
   a clamp hinge that rotatably connects the pair of clamp fingers to the main body.

4. The electrical clamping apparatus of claim 3, wherein the driving force transfer portion comprises:
   a worm gear connected to a shaft of the driving motor to rotate by driving of the driving motor;
   a worm wheel supported by a shaft within the main body and installed to engage with the worm gear to rotate by interlocking with the worm gear; and
   a pivot bearing installed in an end portion of a shaft of the driving motor to prevent the worm gear from separating.

5. The electrical clamping apparatus of claim 4, wherein:
   the pair of crank arms are coupled to the worm wheel by a connection shaft in a state in which the first end of the crank arms is separated by a predetermined gap in an outer circumferential direction from the center of the worm wheel.

6. The electrical clamping apparatus of claim 5, wherein the pair of crank arms have the first end connected to the worm wheel to perform a rotational reciprocating motion and the second end connected to the crank slider to perform a rotational reciprocating motion.

7. The electrical clamping apparatus of claim 6, wherein the pair of crank arms further comprise a bending portion in which the first end of a crank arm is bent upward in order to avoid interference with a shaft of the worm wheel when the pair of crank arms rotate.

8. The electrical clamping apparatus of claim 1, wherein the toggle link portion comprises:
   a pair of second links connected to end portions of the pair of first links, respectively, to rotate about a connection portion when the pair of first links operate; and
   a third link connected between the pair of second links to rotate the clamp hinge according to an operation of the second link.

9. The electrical clamping apparatus of claim 8, wherein in an unclamping state of the clamp portion, the pair of second links are overlapped between the pair of first links, and a portion of the third link is overlapped between a pair of second links overlapped between the pair of first links, and in a clamping state of the clamp portion, a pair of second links rotate to be a horizontal state to the pair of first links, and a third link rotates to be a vertical state to the pair of second links.

* * * * *